US008540951B2

(12) United States Patent
Gharda

(10) Patent No.: US 8,540,951 B2
(45) Date of Patent: Sep. 24, 2013

(54) PROCESS FOR EXTRACTING METALS FROM ALUMINOFERROUS TITANOFERROUS ORES AND RESIDUES

(76) Inventor: Keki Hormusji Gharda, Mumbai (IN)

( * ) Notice: Subject to any disclaimer, the term of this patent is extended or adjusted under 35 U.S.C. 154(b) by 0 days.

(21) Appl. No.: 13/807,031

(22) PCT Filed: Jun. 6, 2011

(86) PCT No.: PCT/IN2011/000376
§ 371 (c)(1),
(2), (4) Date: Dec. 27, 2012

(87) PCT Pub. No.: WO2012/001700
PCT Pub. Date: Jan. 5, 2012

(65) Prior Publication Data
US 2013/0101483 A1    Apr. 25, 2013

(30) Foreign Application Priority Data
Jun. 30, 2010  (IN) .......................... 1909/MUM/2010

(51) Int. Cl.
*C22B 7/00*  (2006.01)
(52) U.S. Cl.
USPC ............... 423/138; 423/69; 423/84; 423/111; 423/155; 423/179; 423/325; 75/503

(58) Field of Classification Search
USPC ............. 423/69, 84, 111, 113, 137, 138, 151, 423/155, 179, 324; 75/433, 486, 487, 500, 75/503; 241/24.1
See application file for complete search history.

(56) References Cited

U.S. PATENT DOCUMENTS

| 3,776,717 | A | | 12/1973 | Kapolyi et al. | |
|---|---|---|---|---|---|
| 3,829,309 | A | * | 8/1974 | Gomes et al. | .................. 75/435 |
| 3,996,332 | A | * | 12/1976 | Elger et al. | ..................... 423/69 |
| 5,043,077 | A | | 8/1991 | Chandler et al. | |
| 6,447,738 | B1 | | 9/2002 | Rendall et al. | |
| 2009/0311154 | A1 | | 12/2009 | Jha et al. | |

FOREIGN PATENT DOCUMENTS

| CN | 101597082 | 12/2009 |
|---|---|---|
| EP | 1096215 | 10/2000 |
| WO | WO2010079369 | 7/2010 |
| WO | WO2012001700 | 1/2012 |

* cited by examiner

Primary Examiner — Steven Bos
(74) Attorney, Agent, or Firm — Jerold I. Schneider

(57) ABSTRACT

A process for extracting metal values from ores or residues is disclosed. The process mentioned above is mainly suitable for aluminoferrous ores such as bauxite, titanoferrous ores such as ilmenite, or residues such as red mud waste. The process involves pulverizing the ore and/or residue and mixing with a carbonaceous material, followed by smelting the iron values and slag in the mixture to yield molten iron and oxides of aluminum and titanium. The process is simple, cost-effective, and provides effective extraction of high purity metal values.

15 Claims, No Drawings

PROCESS FOR EXTRACTING METALS FROM ALUMINOFERROUS TITANOFERROUS ORES AND RESIDUES

CROSS-REFERENCE TO RELATED APPLICATIONS

This application is the entry into the United States of PCT Application Number PCT/IN2011/000376 filed Jun. 6, 2011 and claims priority from Indian Patent Application Number 1909/MUM/2010 filed Jun. 30, 2010, the entirety of each of which are hereby incorporated by reference.

FIELD OF INVENTION

The present invention relates to a process for the extraction of metals from ferrous-based ores and minerals.

Particularly, the present invention relates to a process for the extraction of valuable metals such as aluminum and titanium from aluminoferrous and titanoferrous ores and residues such as Ilmenite, Bauxite and Red Mud.

BACKGROUND

The conventional processes for manufacturing aluminum from bauxite, such as the Bayer process, produce ample quantity of a solid by-product called the red mud, termed so because of the high iron content. Not only does the aluminum industry emit an estimated forty million metric tons of greenhouse gases worldwide each year, they also produce an estimated 3 to 4 metric tons of red mud waste per metric ton of aluminum produced. Due to the environmental issues, the disposal of this red mud, in such large quantities, is a significant problem faced by aluminum industries world-wide. More often this waste is disposed on land or in sea, where the cost of transportation incurred is huge and land disposal can cause contamination of soil and groundwater. Therefore, the development of an economical method which exploits the values of the red mud waste to obtain useful products is of importance.

This red mud contains, apart from oxides of iron, a sizable quantity of other metals like aluminum, titanium, calcium, sodium, and silicon, mainly present as oxides, along with traces of toxic metals. Various methods have been proposed in the past to recover these valuable metals from the red mud slurry. However, most of these methods involve high temperatures or high pressures, therefore high energy consumption. Also, acid digestion of red mud has been suggested in the past to separate its components; however, this method provides a low level purity at high cost. Other methods like "stacking and drying", addition of dispersants, coal dust mixing, addition of additives, have been proposed in the past to enhance the red mud consistency/flowability. Some of these disclosures describing the methods for treatment of red mud waste have been listed in the prior art below. Also, titanoferrous ores such as Ilmenite are processed to separate titanium chloride ($TiCl_4$) and titanium oxide ($TiO_2$) through a series of process steps which give huge volumes of waste streams containing substantial amount of ferrous as iron oxide and iron salts of chlorides or sulfates. The prior art below also lists methods for extracting ferrous from such waste streams.

WO2010079369 discloses a process for total recovery of pure oxides of the elements present in red mud sludge, as well as their partial transformation into high-value added products. The process comprises: heating the red mud residue with water to a temperature between 50-90° C.; after cooling to room temperature adding conc. hydrochloric acid to obtain a resultant solid to liquid ratio between 1:5-1:25; digesting the resultant mixture to obtain a first product containing soluble chloride salts of iron, aluminum, calcium, and sodium, and a solid residue containing titanium and silicon oxides; evaporating the first product and adding diluted hydrochloric acid to obtain a second product containing an enriched solution of chloride salts of iron, aluminum, calcium, and sodium, and an enriched solid residue containing titanium and silicon oxides; primarily separating the enriched solid residue and subsequently separating the iron, aluminum, calcium, and sodium. Using this process, no remnants of the red mud sludge remain.

US20090311154 discloses a zero-waste process for extraction of alumina from different types of bauxite ores and red mud residues and titanium dioxide from Ilmenite. The process comprises: smelting the mixture in the presence of a reducing agent to produce a molten slag, adding an alkali to the molten slag, isolating the molten iron from the resultant mixture to obtain residual slag, and recovering metal oxides from the residual slag. The process recovers most of the metal values and generates only small quantities of siliceous residues at pH 4-5.

U.S. Pat. No. 6,447,738 discloses a process for the extraction of alumina, iron oxide, and titanium dioxide from bauxite ore and clays, and other ore bodies and feed stocks. The process comprises: sulfuric acid leaching of the feed stocks in pressure autoclaves at about 200° C.; reducing the ferric values with $SO_2$ to ferrous sulfate; removing potassium by crystallizing any double salt values of aluminum alkali sulfate; removing the crystals with $SO_2$ gas and hydrolyzing the double salt into a basic aluminum alkali precipitated sulfate salt which is subsequently dried and calcined at 950° C.

U.S. Pat. No. 5,043,077 discloses a method for treating Bayer process red mud slurries to facilitate their handling. The method comprises adding to the slurry an amount of a substance consisting essentially of material of the class consisting of humic acids and humates, in the form of lignite or leonardite, effective to reduce the viscosity of the slurry.

U.S. Pat. No. 3,776,717 discloses a process for the treatment of red mud obtained in the production of aluminum, particularly for the reduction of alkali metals in the red mud and recovery of iron and aluminum. The method comprises: contacting the red mud with humic acid and burnt lime, and recovering the iron content by reduction of the iron oxides.

The present invention discloses a method for extracting valuable metals including aluminum, titanium, and iron from ores such as aluminoferrous ores, e.g. bauxite and titanoferrous ores, e.g. ilmenite, and residues containing alumina and titania, e.g. red mud slurries. From the prior art it is observed that these processes require an acid treatment, the effluents generated during such processes must be, therefore, neutralized before disposal. Also, the known processes require high temperatures and high pressures, therefore, energy intensive. The present invention suggests a method to overcome the afore-mentioned drawbacks of the prior art.

OBJECTS OF THE INVENTION

An object of the present invention is to provide a process for the extraction of metals from ores such as aluminoferrous ores, e.g. bauxite and titanoferrous ores, e.g. ilmenite, and residues containing alumina and titania, e.g. red mud slurries, to obtain value-added products.

Another object of the present invention is to provide an economical process for the extraction of metals from ores.

Yet another object of the present invention is to provide a process for the extraction of metals from ores, which uses thermal energy.

SUMMARY OF THE INVENTION

In accordance with the present invention, is disclosed a process for extracting from a mineral material, which is an ore, a residue, or a mixture thereof, at least one metal value selected from iron, aluminum, titanium, sodium, calcium, and, silicon, said process comprising the steps of:
pulverizing said mineral material to a particle size in the range of 5-500µ to obtain a pulverized material;
combining said pulverized material with a carbonaceous material to obtain a resultant mixture, wherein, the ratio of said pulverized material to said carbonaceous material is in the range of 88:12-95:5;
moulding said resultant mixture into a form selected from pellets, lumps, and briquettes, to obtain a formed material;
smelting, at least partly, metal and slag in said formed material, to separate the iron values along with the slag containing at least one metal value selected from aluminum, titanium, calcium, sodium, and silicon; and
separating the iron values from the slag.

Typically, in accordance with the present invention, the process includes the step of selecting said carbonaceous material from the group of materials consisting of wood, charcoal, coke, semi-coke, coal, biomass, char, fuel oil, and natural gas.

Preferably, in accordance with the present invention, the process includes the step of using char from coal pyrolysis as said carbonaceous material.

Typically, in accordance with the present invention, the process includes the step of smelting said formed material in a shaft furnace by burning with air, preferably enriched air, more preferably oxygen, at a temperature in the range of 1200-1800° C., preferably in the range of 1400-1500° C.

Preferably, in accordance with the present invention, the process includes the step of smelting said formed material in the presence of hot reducing gases, more preferably obtained by using coal char oxygen and steam/recycle $CO_2$.

In accordance with the present invention, the process includes the step of selecting at least one mineral material from the group of materials consisting of bauxite, ilmenite, and red mud.

Alternatively, in accordance with the present invention, the process includes the step of adding a slag-forming agent to said pulverized material, wherein, the slag-forming agent is selected from soda ash, lime, lime stone, dolomite, and an alkali source.

Alternatively, in accordance with the present invention, the process includes the step of pyrolysis/charring of said carbonaceous material and combining the charred carbonaceous material with said pulverized material to obtain said resultant mixture.

In accordance with the present invention, the process includes the step of separating iron values in a form selected from molten iron, iron carbide, and mixtures thereof.

Typically, in accordance with the present invention, the process includes the step of separating at least one metal value selected from oxides of aluminum, titanium and silicon, and alkali salts of calcium and sodium, from the slag.

Preferably, in accordance with the present invention, the process includes the step of processing the slag comprising the metal oxides, in steps involving: (i) mild pulverization, (ii) air classification, and (iii) magnetic separation, to further separate iron values therefrom.

More preferably, in accordance with the present invention, the process includes the step of further processing the slag comprising the metal oxides, in steps involving: (i) carbochlorination of the oxides with additional said carbonaceous material in a fluidized bed reactor to obtain metal chlorides, and (ii) extracting and purifying the metal chlorides.

DETAILED DESCRIPTION OF THE INVENTION

The present invention envisages a process for extracting metal values including aluminum, titanium, silicon, calcium, sodium, and iron from ores such as aluminoferrous ores, e.g. bauxite, titanoferrous ores, e.g. ilmenite, and iron ores, and residues containing alumina and titania, e.g. red mud slurries. The process involves combining a metal-value-containing mineral material with a carbonaceous material to effect reduction of iron oxide, wherein, preferably, the carbonaceous material is used in stoichiometric excess to the mineral material to facilitate the separation of the metal values. The process comprises the step of melting the iron component in the mineral matter to consolidate the iron value and thereby separate the iron value from the other metal values like oxides of aluminum, titanium, and silicon, and alkali salts of calcium and sodium. The reduction of oxides of iron and their subsequent melting and separation is preferably carried out without the addition of any fluxing compounds like alkalies, carbonates, or oxides of sodium, calcium, potassium, magnesium, and the like; thus simplifying the recovery of aluminum and titanium metal values.

The process of the present invention comprises the step of pulverizing the mineral material, which is an ore, a residue, or a mixture thereof comprising at least one metal value from iron, aluminum, titanium, silicon, sodium, and calcium. The mineral material is pulverized, if necessary, to a particle size in the range of 5-500µ and the pulverized material is then combined with the carbonaceous material. Prior to combining, the carbonaceous material, which is selected from coal, coke, semi-coke, wood, charcoal, biomass, fuel oil, char, and natural gas, may be charred and the charred carbonaceous material along with the recovered volatiles can be combined with the pulverized material. The most preferred carbonaceous material is char from coal pyrolysis process. Preferably, the carbonaceous material is added in 10
  40% stoichiometric excess to the pulverized mineral material, wherein, the ratio of the pulverized material to the carbonaceous material is in the range of 88:12-95:5 Additionally, slag-forming agents may be mixed with the pulverized material to enhance separation of the metal values; wherein, the slag-forming agents are typically selected from soda ash, lime, lime stone, dolomite, and an alkali source.

The resultant mixture of the pulverized material and the carbonaceous material is molded to form pellets, lumps, or briquettes. This formed material is then smelted in a shaft furnace to cause at least a part of the metal and slag in the formed material to melt. The formed material is loaded in a cupola and the cupola is charged in a shaft furnace, where, the formed material is burnt with air, preferably enriched air, more preferably oxygen, at a temperature in the range of 1200-1800° C., preferably in the range of 1400-1500° C. Also, hot reducing gases, generated separately in a gasifier, may be passed through the shaft furnace to effect/enhance the smelting process. The smelting process effects in reduction of the iron oxide and melting of at least a part of the metal and slag in the formed material to give molten iron values and slag containing at least one other metal value from aluminum, titanium, silicon, calcium, and sodium.

The iron values are subsequently separated from the slag, as molten iron, iron carbide, or mixtures thereof, by methods including: tapping the liquid, physical separation methods using difference in specific gravity, magnetic separation, and the like. The slag thus separated primarily comprises oxides of aluminum, titanium, and silicon, and alkali salts of calcium and sodium. The slag is processed to separate out at least one of the metal value, by methods including: mild pulverization, air classification, and magnetic separation, to remove impurities and left-over iron values and obtain high purity metal oxides of aluminum, titanium, and silicon. The purified metal oxides are then subjected to further processing, involving: carbo-chlorination of the oxides with additional make-up carbonaceous material as reductant in a fluidized bed reactor to obtain metal chlorides, i.e. chlorides of aluminum and titanium, extracting the metal chlorides thereof, and purification of the metal chlorides by filtration and fractionation. The resultant chlorides are separated by methods known in the art. The chlorides of aluminum and titanium ($AlCl_3$ and $TiCl_4$), so obtained, are converted to alkali metal complexes and electrolyzed to produce the respective metals.

Test Results

The invention will now be described with respect to the following example which does not limit the scope and ambit of the invention in anyway and only exemplifies the invention.

EXAMPLE 1

80 kg of red mud slurry was mixed with 5 kg of coke powder having 97% carbon content. The red mud slurry composition is mentioned in TABLE 1.

TABLE 1

Red mud slurry composition.

| $Fe_2O_3$ | $Al_2O_3$ | $TiO_2$ | $SiO_2$ | $Na_2O$ |
|---|---|---|---|---|
| 37% | 21.15% | 10.38% | 7.8% | 4.8% |

The mixture was formed into pellets of 30-37 mm size. These pellets were smelted in a cupola of 26 cm clear diameter for a period of 2 hours using coke as fuel for heating. The temperature attained with air blowing was 1500° C. The molten metal and slag were discharged hot and separated into consolidated iron part weighing 18 kg with 97% iron and 1.5% carbon. The slag was pulverized and subjected to magnetic separation. A mixture of $TiO_2$, $Al_2O_3$ and $SiO_2$ containing only 6% iron oxide was obtained.

EXAMPLE 2

80 kg of red mud slurry as above was mixed with 5 kg of coke powder having 97% carbon content. The mixture was formed into pellets of 40 mm size. Induration of the pellets was done at 600° C. for 4 hours. These pellets were smelted in a cupola of 26 cm clear diameter for 3 hours using coke as fuel for heating. The temperature attained with air blowing was 1500-1650° C. The molten metal and slag were discharged hot and separated into consolidated iron part weighing 18 kg with 98% iron and 1% carbon. The slag was subjected to pulverizing and classification followed by magnetic separation. A mixture of $TiO_2$, $Al_2O_3$ and $SiO_2$ containing about 7% iron was obtained.

Technical Advantages

A process for extracting from a mineral material, which is an ore, a residue, or a mixture thereof, at least one metal value selected from iron, aluminum, titanium, sodium, calcium, and silicon; the process comprising the step of mixing a pulverized mineral material with a carbonaceous material and smelting the iron values and slag in the mixture to yield molten iron and metal oxides; the process as described in the present invention has several technical advantages including but not limited to the realization of: the process is simple and cost effective, provides value-added products, and uses thermal energy.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary. Wherever a range of values is specified, a value up to 10% below and above the lowest and highest numerical value respectively, of the specified range, is included in the scope of the invention.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A process for extracting from a mineral material, which is an ore, a residue, or a mixture thereof, iron value and at least one metal value selected from the group consisting of aluminum, titanium, sodium, calcium, and, silicon, said process comprising the steps of:
   pulverizing said mineral material to a particle size in the range of 5-500μ, to obtain a pulverized material;
   combining said pulverized material with a carbonaceous material to obtain a resultant mixture, wherein, the ratio of said pulverized material to said carbonaceous material is in the range of 88:12-95:5;
   moulding said resultant mixture to obtain a formed material in a form selected from the group consisting of pellets, lumps, and briquettes;
   smelting, at least partly, metal and slag in said formed material, to separate the iron values along with the slag containing at least one metal value selected from the group consisting of aluminum, titanium, calcium, sodium, and silicon; and
   separating the iron values from the slag.

2. The process as claimed in claim 1, wherein said carbonaceous material is selected from the group consisting of wood, charcoal, coke, semi-coke, coal, biomass, char, fuel oil, and natural gas.

3. The process as claimed in claim 1, wherein the carbonaceous material is char obtained from coal pyrolysis.

4. The process as claimed in claim 1, wherein the step of smelting said formed material is carried out in a shaft furnace by burning with air at a temperature ranging from 1200 to 1800° C.

5. The process as claimed in claim 4, wherein the step of smelting said formed material is carried out in the presence of hot reducing gases.

6. The process as claimed in claim 1, wherein the mineral material is at least one selected from the group consisting of bauxite, ilmenite, and red mud.

7. The process as claimed in claim 1, which includes the step of adding a slag-forming agent to said pulverized material, wherein, said slag-forming agent is selected from the group consisting of soda ash, lime, lime stone, dolomite, and an alkali source.

8. The process as claimed in claim 1, which includes a step of pyrolysis of said carbonaceous material.

9. The process as claimed in claim 1, wherein the separated iron values are in a form selected from the group consisting of molten iron and iron carbide.

10. The process as claimed in claim 1, which includes a step of separating at least one metal value selected from the group consisting of oxides of aluminum, titanium and silicon, and alkali salts of calcium and sodium, from the slag.

11. The process as claimed in claim 10, which includes a step of processing the slag comprising the metal oxides by: (i) mild pulverization, (ii) air classification, and (iii) magnetic separation, to further separate iron values therefrom.

12. The process as claimed in claim 11, which includes a step of further processing the slag comprising the metal oxides by: (i) carbo-chlorination of the oxides with additional said carbonaceous material in a fluidized bed reactor to obtain metal chlorides, and (ii) extracting and purifying the metal chlorides.

13. The process as claimed in claim 1, wherein the step of smelting said formed material is carried out in a shaft furnace by burning with enriched air at a temperature ranging from 1200 to 1800° C.

14. The process as claim in claim 1, wherein the step of smelting said formed material is carried out in a shaft furnace by burning with oxygen at a temperature ranging from 1200 to 1800° C.

15. The process as claimed in claim 1, which includes a step of charring of said carbonaceous material.

* * * * *